(12) United States Patent
Shin et al.

(10) Patent No.: US 11,613,153 B2
(45) Date of Patent: Mar. 28, 2023

(54) AIR CONDITIONING DEVICE FOR AN ELECTRIC VEHICLE AND AN AIR CONDITIONING SYSTEM FOR AN ELECTRIC VEHICLE USING SAME

(71) Applicants: HYUNDAI MOTOR COMPANY, Seoul (KR); KIA MOTORS CORPORATION, Seoul (KR)

(72) Inventors: Gee Young Shin, Suwon-si (KR); Seung Sik Han, Hwaseong-si (KR); Dong Ho Kwon, Yongin-si (KR); Myung Hoe Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 179 days.

(21) Appl. No.: 17/165,512

(22) Filed: Feb. 2, 2021

(65) Prior Publication Data

US 2022/0088989 A1 Mar. 24, 2022

(30) Foreign Application Priority Data

Sep. 18, 2020 (KR) .......................... 10-2020-0120696

(51) Int. Cl.
*B60H 1/00* (2006.01)
*B60H 1/32* (2006.01)
*B60H 1/22* (2006.01)

(52) U.S. Cl.
CPC ..... *B60H 1/00021* (2013.01); *B60H 1/00392* (2013.01); *B60H 1/00485* (2013.01); *B60H 1/2215* (2013.01); *B60H 1/3227* (2013.01); *B60H 1/3228* (2019.05);
(Continued)

(58) Field of Classification Search
CPC .............. B60H 1/00021; B60H 1/3228; B60H 1/00392; B60H 1/00485; B60H 1/2215; B60H 1/3227; B60H 2001/00128; B60H 2001/0015; B60H 2001/2228
See application file for complete search history.

(56) References Cited

U.S. PATENT DOCUMENTS 5,685,162 A * 11/1997 Iritani ................ B60H 1/00921
62/90
2013/0019615 A1 * 1/2013 Choi .................. B60H 1/00914
62/238.7
2018/0099539 A1 4/2018 Han
(Continued)

FOREIGN PATENT DOCUMENTS

KR 20080092527 A 10/2008
KR 101219967 B1 1/2013
(Continued)

*Primary Examiner* — Marc E Norman
(74) *Attorney, Agent, or Firm* — Lempia Summerfield Katz LLC (57) ABSTRACT

An air conditioning device for an electric vehicle includes: a housing having an air conditioning passage connecting an air inlet port to an air discharge port; an evaporator, an air heater, and an electric heater, which are positioned in series in the air conditioning passage in the housing; and a bypass door positioned after the evaporator in the air conditioning passage in the housing and configured to selectively allow some of air passing through the evaporator to bypass the air heater and the electric heater to the air discharge port.

12 Claims, 9 Drawing Sheets

(52) U.S. Cl.
CPC ............ *B60H 2001/0015* (2013.01); *B60H 2001/00128* (2013.01); *B60H 2001/2228* (2013.01)

(56) References Cited

U.S. PATENT DOCUMENTS

| | | | |
|---|---|---|---|
| 2019/0077223 A1* | 3/2019 | Ishizeki | B60H 1/22 |
| 2019/0135075 A1* | 5/2019 | Hwang | B60H 1/00921 |
| 2021/0094391 A1* | 4/2021 | Miyakoshi | B60H 1/00485 |
| 2021/0260959 A1* | 8/2021 | Nakahara | B60H 1/00807 |
| 2021/0309069 A1* | 10/2021 | Kim | B60H 1/00485 |

FOREIGN PATENT DOCUMENTS

| | | |
|---|---|---|
| KR | 20180038728 A | 4/2018 |
| KR | 101956179 B1 | 3/2019 |

\* cited by examiner

AIR CONDITIONING DEVICE FOR AN ELECTRIC VEHICLE AND AN AIR CONDITIONING SYSTEM FOR AN ELECTRIC VEHICLE USING SAME

CROSS REFERENCE TO RELATED APPLICATION

The present application claims priority to Korean Patent Application No. 10-2020-0120696, filed Sep. 18, 2020, the entire contents of which are incorporated herein for all purposes by this reference.

BACKGROUND

Field of the Disclosure

The present disclosure relates to an air conditioning device for an electric vehicle, in which an evaporator, an air heater, and a Positive Temperature Coefficient (PTC) heater are positioned in series while a temperature adjustment door has been omitted. The present disclosure also relates to an air conditioning system for an electric vehicle using the air conditioning device. The in-series positioning of the evaporator, the air heater, and the PTC heater reduces the overall size of the air conditioning device.

Description of the Related Art

In recent years, with the advancement in environment protection technologies, electric vehicles, which reduce fuel consumption, have grown in features and popularity. Such electric vehicles are driven using a battery-powered motor that outputs motive power. Therefore, electric vehicles do not produce carbon dioxide emissions and create little noise. A motor has an advantage of high energy efficiency over an engine. For this reason, electric vehicles have been recognized as environment-friendly vehicles.

Core technologies for realizing these electric vehicles include technologies associated with battery modules. In recent years, studies have actively been conducted on reducing weight and miniaturizing batteries and shortening charging time, and the like. When used in an optimal environment, the battery module may have a long lifespan and may perform optimal functions. However, due to heat generated during operation and a change in ambient temperature, it is difficult to use the module in the optimal environment.

Electric vehicles do not have a waste heat source generated during combustion in an independent engine such as an internal combustion engine. The electric vehicles produce warm air for winter heating using an electric heating device. In addition, in electric vehicles, warming-up of a battery is necessary to improve performance in charging and discharging of the battery during cold weather. For this reason, electric vehicles each are equipped with a separate coolant-type electric heater. In other words, a cooling and heating system for adjusting a temperature of a battery module to maintain an optimal temperature environment for the battery module is operated separately from a cooling and heating system for air conditioning inside the electric vehicle.

To this end, in the case of an air conditioning system for air conditioning inside an electric vehicle, heat pump technologies for minimizing energy consumption for heating to increase mileage are employed to minimize energy consumption. The air conditioning system is equipped with a temperature adjustment door for selectively adjusting supply amounts of cooled air and warm air. Components, such as an evaporator and an air heater are positioned at a distance away from each other. Thus, the overall size of the air conditioning system is increased.

The foregoing is intended merely to aid in understanding the background of the present disclosure. The foregoing is not intended to mean that the present disclosure falls within the purview of the related art that is already known to those having ordinary skill in the art.

SUMMARY

An objective of the present disclosure is to provide an air conditioning device for an electric vehicle, in which an evaporator, an air heater, and a Positive Temperature Coefficient (PTC) heater are positioned in series while a temperature adjustment door has been omitted. Another objective of the present disclosure is to provide an air conditioning system for an electric vehicle using the air conditioning device. The in-series positioning of the evaporator, the air heater, and the PTC heater reduces the overall size of the air conditioning device and the air conditioning system.

According to an aspect of the present disclosure, an air conditioning device for an electric vehicle is provided. The device includes: a housing having an air conditioning passage connecting an air inlet port to an air discharge port; an evaporator, an air heater, and an electric heater, which are positioned in series in the air conditioning passage in the housing; and a bypass door positioned after the evaporator in the air conditioning passage in the housing and configured to selectively allow some of air passing through the evaporator to bypass the air heater and the electric heater to the air discharge port.

In the air conditioning device, the air conditioning passage may connect from the air intake port to the air discharge port. The air conditioning passage may include a first flow passage in which the bypass door is installed and a second flow passage connecting the first flow passage to the air discharge portion.

In the air conditioning device, the evaporator may be installed in a manner that the evaporator is connected to the first flow passage and the second flow passage. The air heater and the electric heater may be installed in series after the evaporator in the second flow passage.

According to another aspect of the present disclosure, an air conditioning system for an electric vehicle using the air conditioning device is provided. The system includes: a first refrigerant line connecting a compressor to the air heater; a second refrigerant line connecting the air heater through a first expander to an external heat exchanger; a third refrigerant line connecting the external heat exchanger through a second expander to the evaporator; and a fourth refrigerant line connecting the evaporator to the compressor.

The air conditioning system may further include: a first bypass line connecting the first refrigerant line to the second refrigerant line. Refrigerant compressed in the compressor bypasses the air heater to the first bypass line. A first valve may be provided between the first refrigerant line and the first bypass line.

The air conditioning system may further include: a second bypass line connecting the third refrigerant line to the fourth refrigerant line. The refrigerant bypasses the second expander and the evaporator to the second bypass line. A second valve may be provided in the second bypass line.

The air conditioning system may further include a controller configured to control the first expander, the second expander, the first valve, and the second valve according to a cooling mode, a heating mode, and a temperature adjustment and dehumidification mode that are preset.

In the air conditioning system, in the cooling mode, the controller may open the first valve in a direction of allowing the refrigerant to flow to the first bypass line and may close the second valve so that the first expander is fully opened and the second expander expands the refrigerant.

In the air conditioning system, in the cooling mode, the controller may not operate the electric heater and may open the bypass door.

In the air conditioning system, in the heating mode, the controller may open the first valve in a direction of allowing the refrigerant to flow to the air heater and may open the second valve so that the first expander expands the refrigerant and the second expander is closed.

In the air conditioning system, in the heating mode, the controller may operate the electric heater and may close the bypass door.

In the air conditioning system, in the temperature adjustment and dehumidification mode, the controller may open the first valve in a direction of allowing the refrigerant to flow to the air heater and may close the second valve so that the first expander is fully opened and the second expander expands the refrigerant.

In the air conditioning system, in the temperature adjustment and dehumidification mode, the controller may determine the temperature of conditioned air, which is adjusted by the air heater and the evaporator. The controller may perform control that turns on or off the electric heater and control that opens or closes the first valve so that the temperature of the conditioned air is maintained at a level of a target temperature that varies with a required temperature inside the electric vehicle.

In the air conditioning system, in the temperature adjustment and dehumidification mode, when the temperature of conditioned air is higher than a target temperature, the controller may not operate the electric heater and may open the first valve in a direction of allowing the refrigerant to flow to the first bypass line.

In the air conditioning system, in the temperature adjustment and dehumidification mode, when the temperature of conditioned air is lower than a target temperature, the controller may operate the electric heater and may open the bypass door in a direction of allowing the air to flow to the air heater and the electric heater to increase an amount of air flow.

As described above in terms of structure, in the air conditioning device for an electric vehicle and the air conditioning system for an electric vehicle using the air conditioning device, the evaporator, the air heater, and the PTC heater are positioned in series for temperature adjustment, and the bypass door substitutes for a temperature adjustment door. With this compact structure, the overall sizes of the air conditioning device, and the air conditioning system may be reduced. In an embodiment, cooling and heating operations are performed by switching between a flow of the refrigerant circulating throughout the evaporator and a flow of the refrigerant circulating throughout the air heater. Thus, the performance in cooling and heating by the heat pump is improved.

BRIEF DESCRIPTION OF THE DRAWINGS

The above and other objectives, features, and other advantages of the present disclosure should be more clearly understood from the following detailed description when taken in conjunction with the accompanying drawings, in which.

DETAILED DESCRIPTION

An air conditioning device for an electric vehicle and an air conditioning system for an electric vehicle using the air conditioning device according to preferred embodiments of the present disclosure are described below with respect to the accompanying drawings. When a component, device, element, or the like of the present disclosure is described as having a purpose or performing an operation, function, or the like, the component, device, or element should be considered herein as being "configured to" meet that purpose or to perform that operation or function. Further, the controller described herein may include a processor programmed to perform the noted operation, function, operation, or the like.

Figure 1:
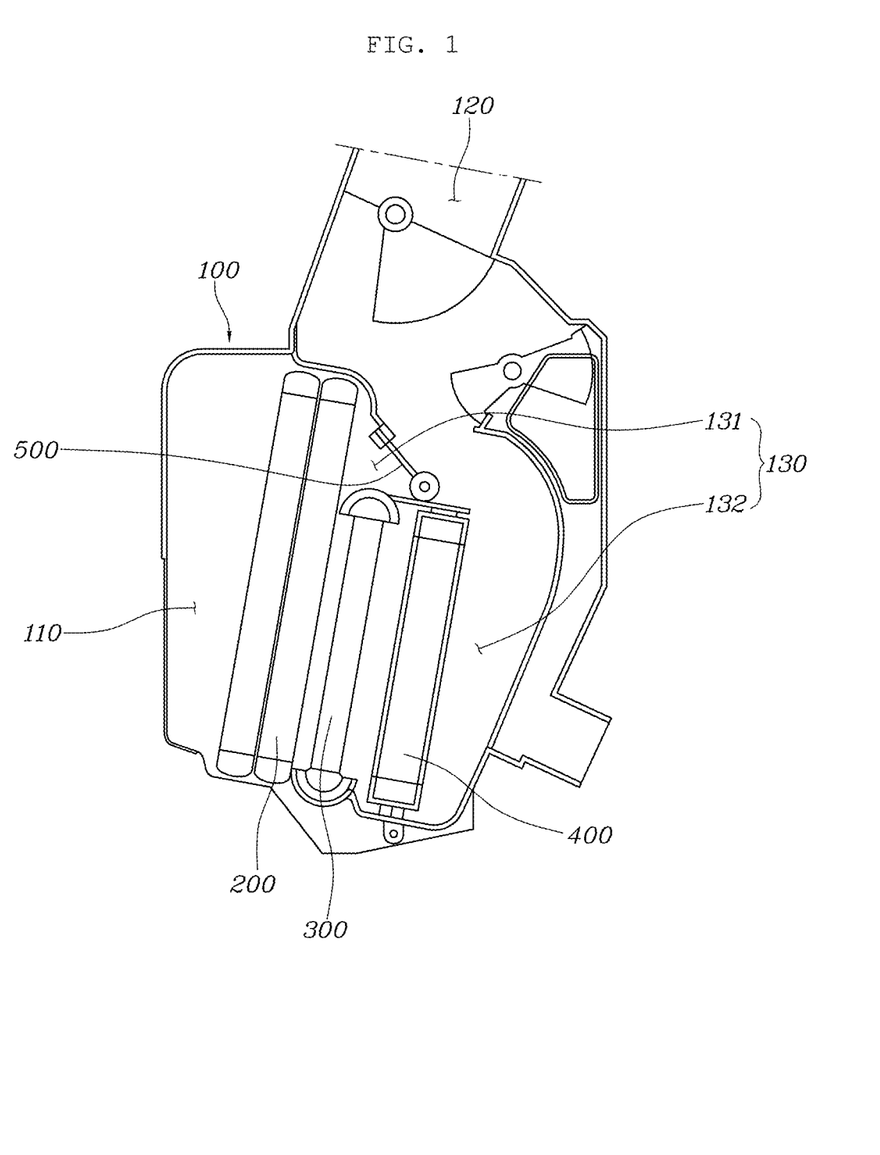
FIG. 1 is a diagram of an air conditioning device for an electric vehicle according to the present disclosure.
Figure 2:
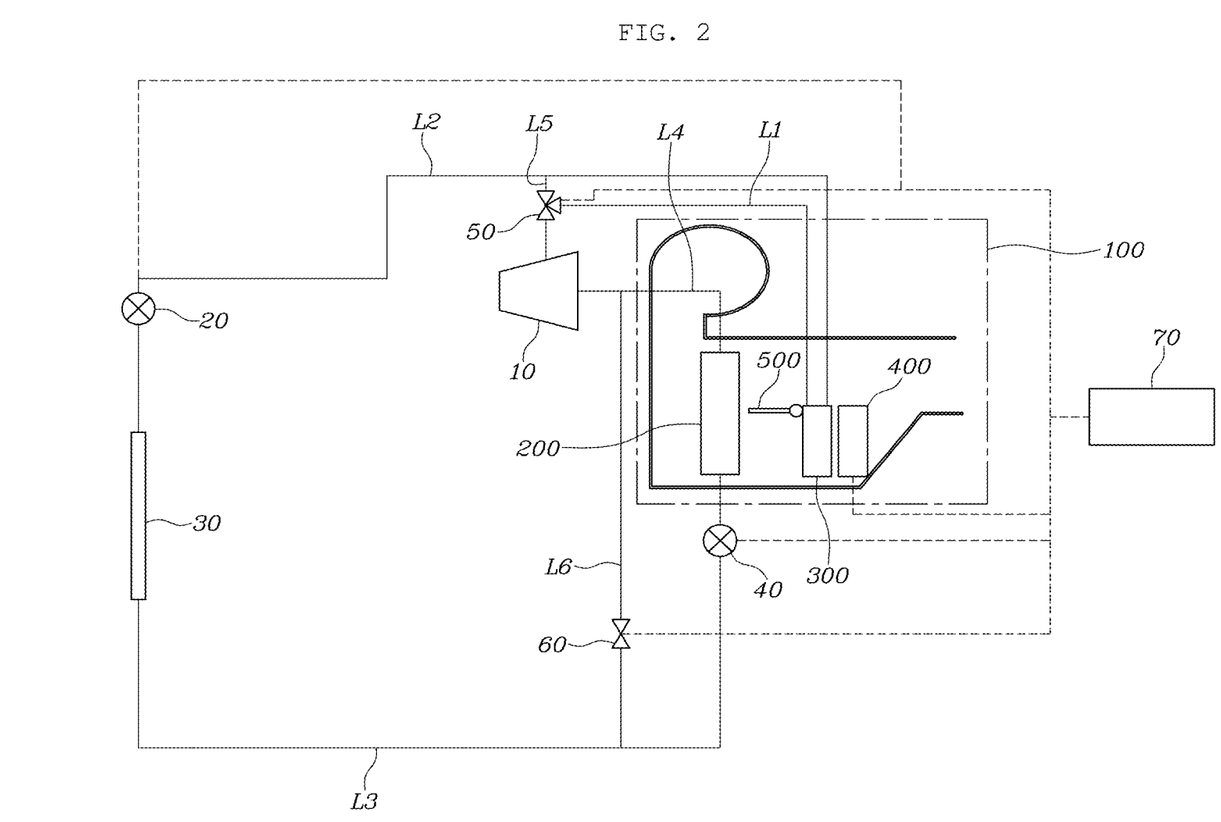
FIG. 2 is a circuit diagram of an air conditioning system for an electric vehicle using the air conditioning device in FIG. 1.
Figure 3:
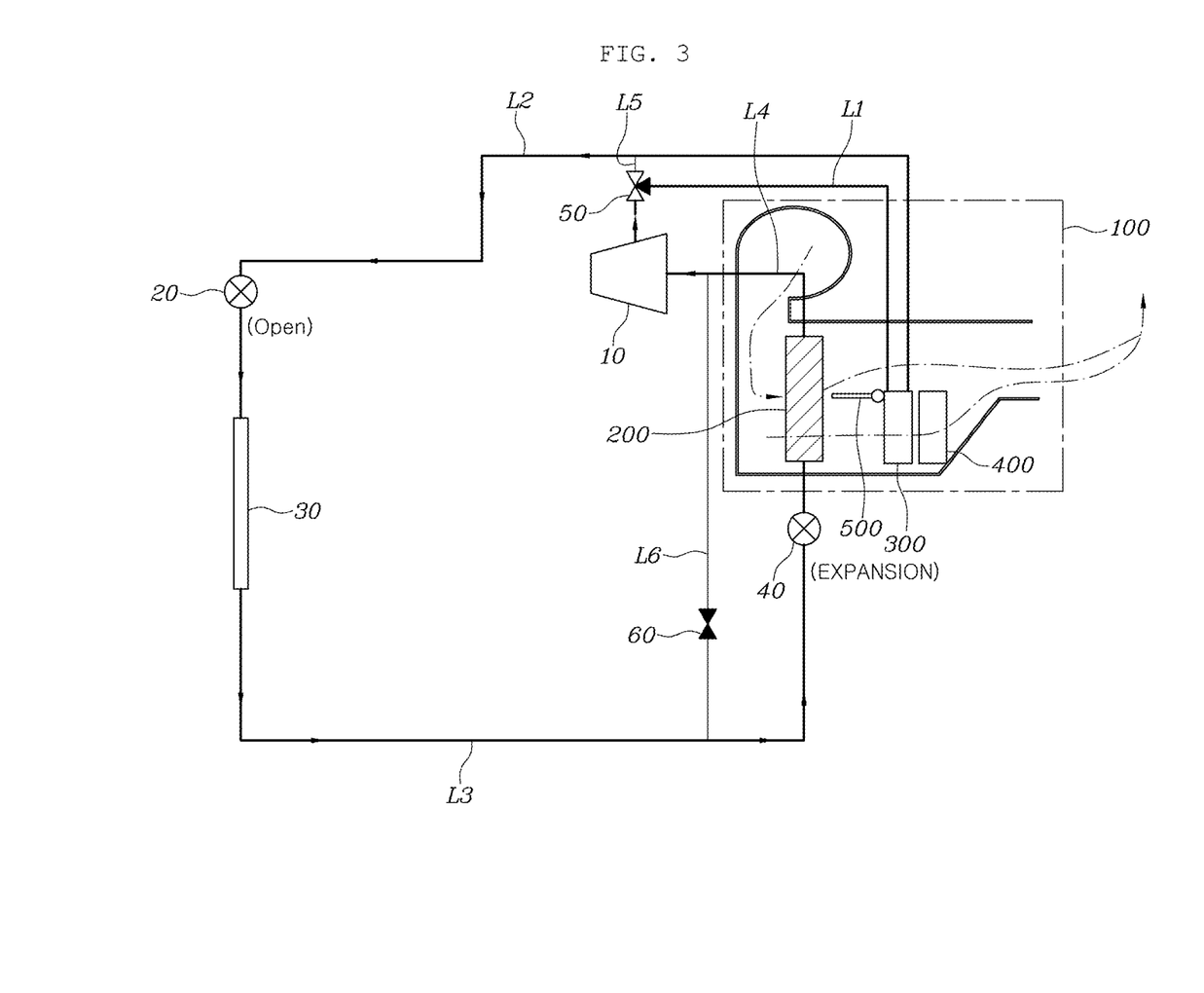
FIG. 3 is a circuit diagram of the air conditioning system for the electric vehicle, operating in a cooling mode.
Figure 4:
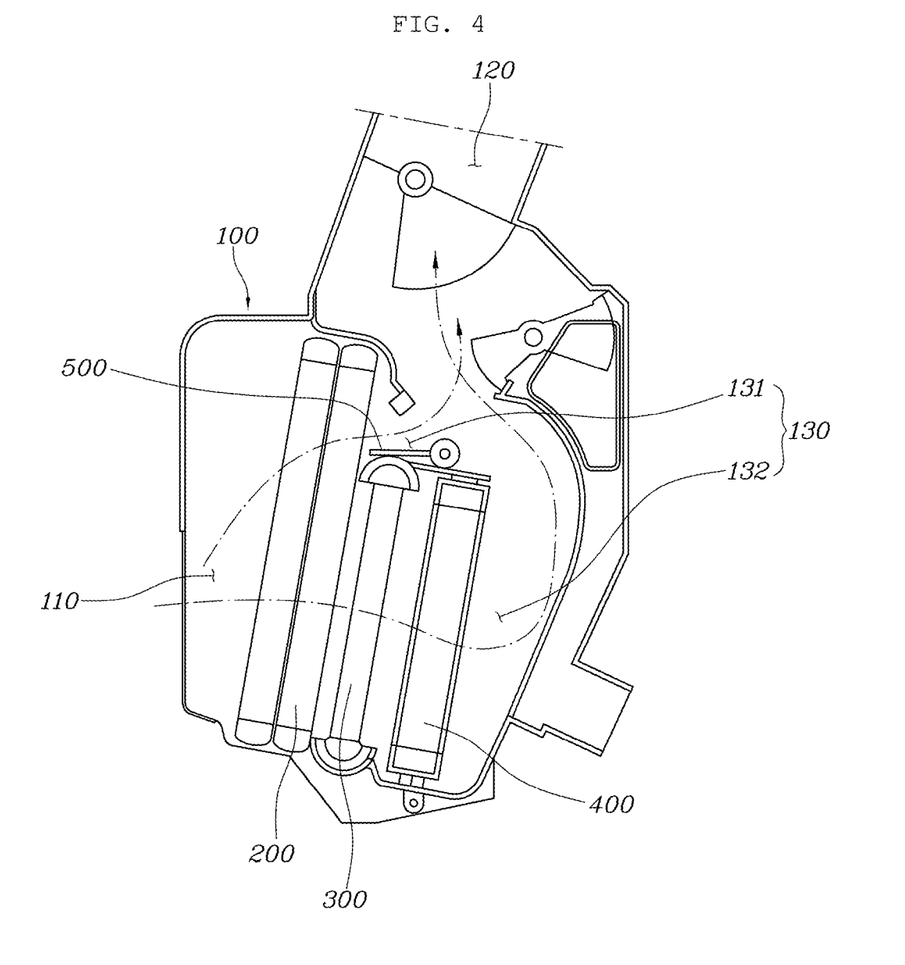
FIG. 4 is a diagram of the air conditioning device for the vehicle, operating in the cooling mode.
Figure 5:
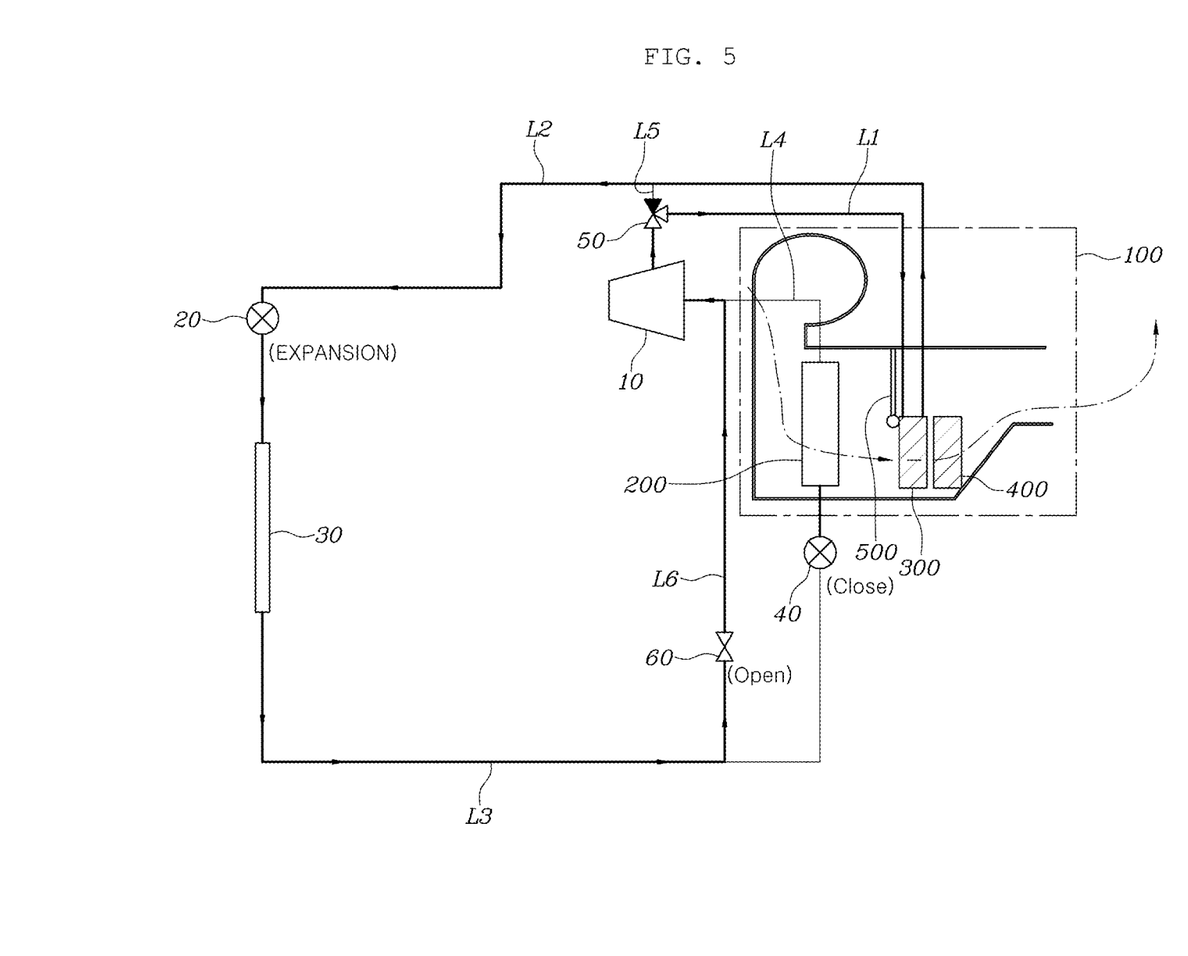
FIG. 5 is a circuit diagram of the air conditioning system for the vehicle, operating in a heating mode.
Figure 6:
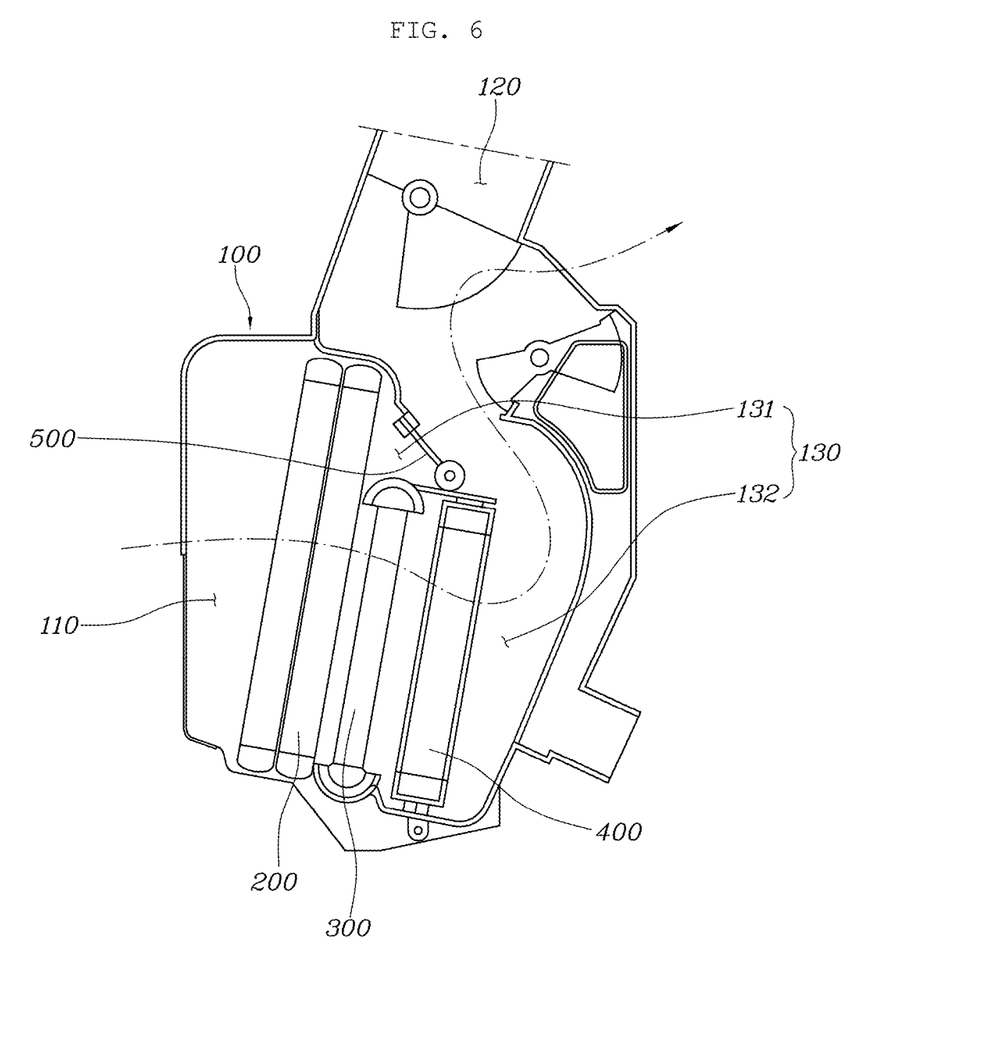
FIG. 6 is a diagram of the air conditioning device for the electric vehicle, operating in the heating mode.
Figure 7:
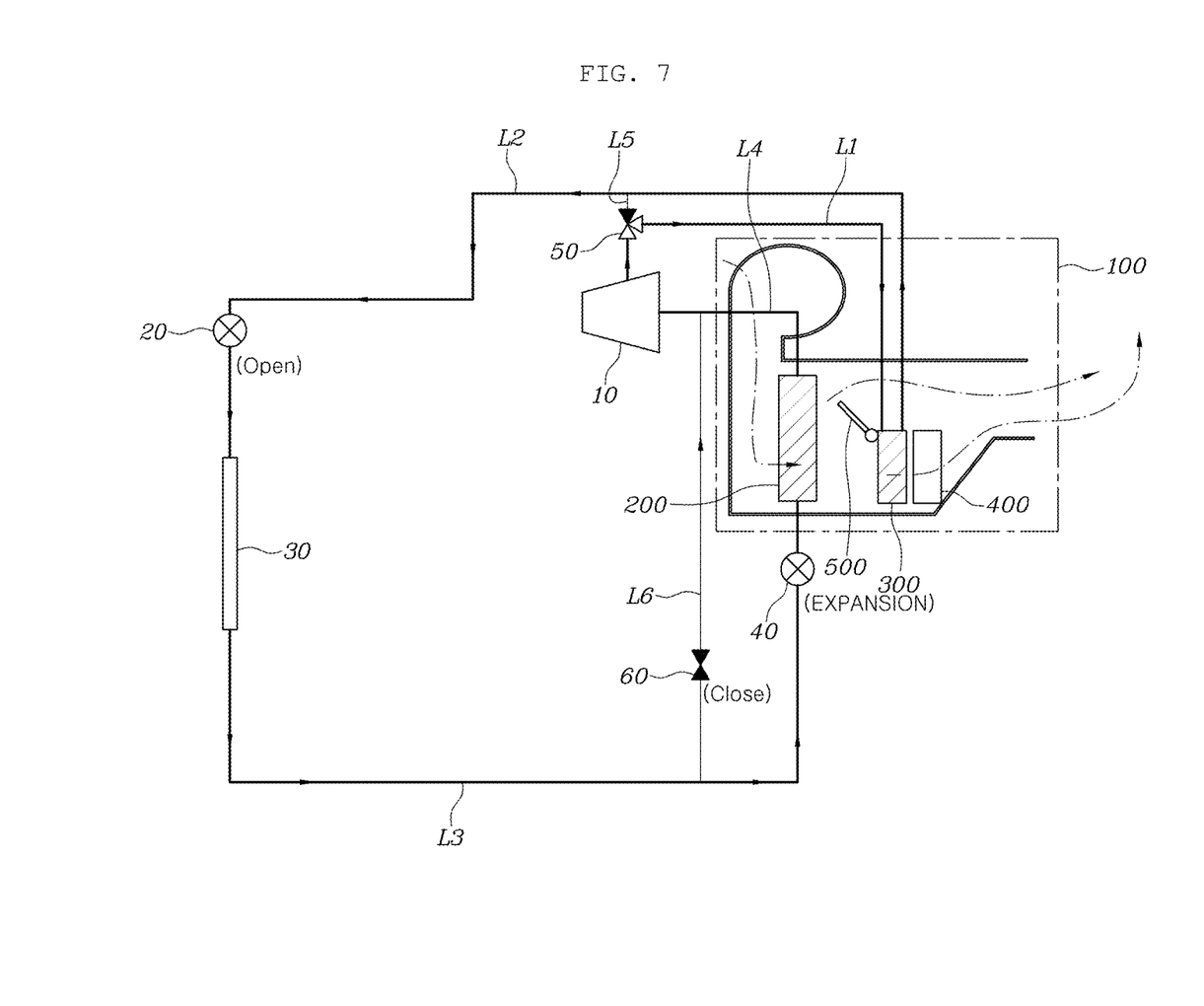
FIG. 7 is a circuit diagram of the air conditioning system for the vehicle, operating in a temperature adjustment and dehumidification mode.
Figure 8:
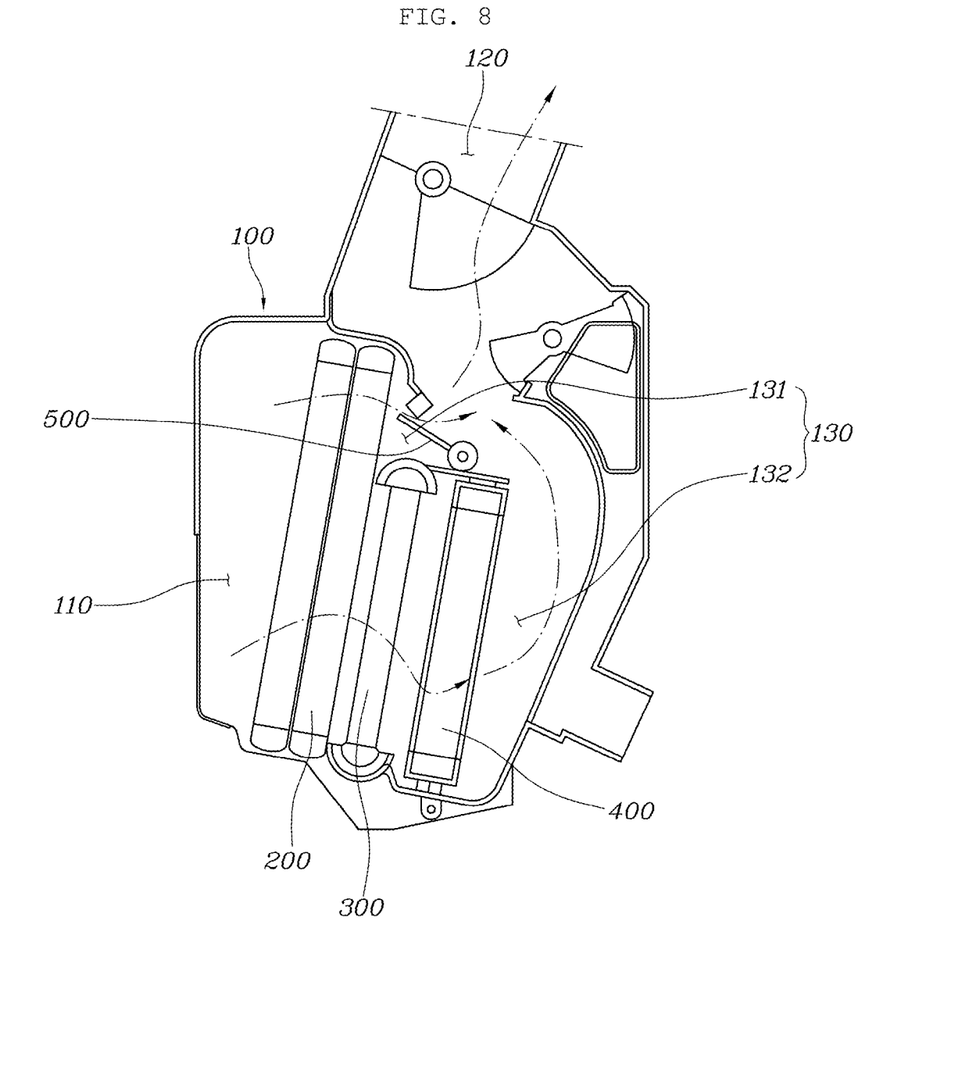
FIG. 8 is a diagram of the air conditioning device for the electric vehicle, operating in the temperature adjustment and dehumidification mode.
Figure 9:
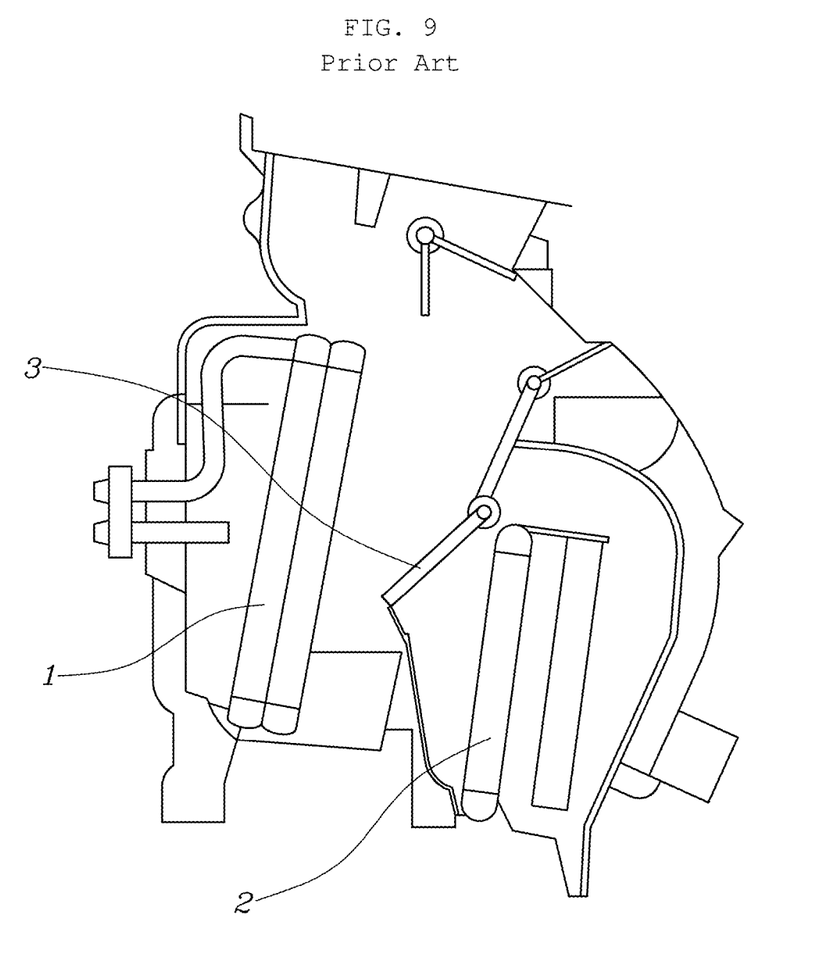
FIG. 9 is a diagram of an air conditioning device for an electric vehicle in the related art.

FIG. 1 is a diagram of the air conditioning device for the electric vehicle according to the present disclosure. FIG. 2 is a circuit diagram of the air conditioning system for the electric vehicle using the air conditioning device in FIG. 1. FIG. 3 is a circuit diagram of the air conditioning system for the electric vehicle, operating in a cooling mode. FIG. 4 is a diagram of the air conditioning device for the vehicle, operating in the cooling mode. FIG. 5 is a circuit diagram of the air conditioning system for the vehicle, operating in a heating mode. FIG. 6 is a diagram of the air conditioning device for the electric vehicle, operating in the heating mode. FIG. 7 is a circuit diagram of the air conditioning system for the vehicle, operating in a temperature adjustment and dehumidification mode. FIG. 8 is a diagram of the air conditioning device for the electric vehicle, operating in the temperature adjustment and dehumidification mode. FIG. 9 is a diagram of an air conditioning device for an electric vehicle in the related art.

The air conditioning device for the electric vehicle according to the present disclosure, as illustrated in FIG. 1, includes a housing 100, an evaporator 200, an air heater 300, an electric heater 400, and a bypass door 500. The housing 100 has an air conditioning passage 130 connecting an air intake port 110 to an air discharge port 120. The evaporator 200, the air heater 300, and the electric heater 400 are positioned in series in the air conditioning passage 130 in the housing 100. The bypass door 500 is positioned after the evaporator 200 in the air conditioning passage 130 in the housing 100. The bypass door 500 selectively allows some of the air passing through the evaporator 200 to bypass the air heater 300 and the electric heater 400 to the air discharge port 120.

The housing 100 has the air intake port 110 on one side. Air passing through the air conditioning passage 130 flows through the air discharge port 120. The temperature of introduced air is adjusted by the evaporator 200 or through the air heater 300 and the electric heater 400 and is supplied as conditioned air inside the vehicle. Various vents, such as a defrost vent and a foot vent, find application as the air discharge port 120 of the housing 100. The vent has a door with which the degree of vent-opening is controlled. An example of the electric heater 400 is a Positive Temperature Coefficient (PTC) heater.

In an embodiment, the evaporator 200, the air heater 300, and the electric heater 400 are provided in the air conditioning passage 130 of the housing 100, and the evaporator 200, the air heater 300, the electric heater 400 are positioned in series adjacent to each other. Accordingly, cooled air and warm air are produced by the evaporator 200, and the heater 300 and the electric heater 400. A heat pump system that includes a compressor 10, an external heat exchanger 30, and an expander in addition to the evaporator 200 and the air heater 300 are described below.

The bypass door 500 is positioned after the evaporator 200 in the air conditioning passage 130 in the housing 100. The bypass door 500 is positioned after the evaporator 200 in the air conditioning passage 130 in the housing 100. This makes it possible for some of the air to pass through the evaporator 200 to bypass the air heater 300 and the electric heater 400 to the air discharge port 120, or for air to pass through the air heater 300 and the electric heater 400. As illustrated in FIG. 9, in a housing in the related art, an evaporator 1 and an air heater 2 are positioned at a distance away from each other, and a temperature door 3 for adjusting temperature of conditioned air is provided between the evaporator 1 and the air heater 2. According to the present disclosure, as illustrated in FIG. 1, the temperature door 3 in the related art has been omitted, and the bypass door 500 is instead provided in a passage through which some of the air passes. Thus, an overall layout area is reduced.

The bypass door 500 is opened when providing cooled air. Thus, air passing through the evaporator 200 passes through the air heater 300 and the electric heater 400, and some of the air passes through the bypass door 500. Thus, an amount of cooled air is secured.

The bypass door 500 is closed when providing warm air. Thus, air passes only through the air heater 300 and the electric heater 400. This leads to improving the efficiency of producing warm air.

In this manner, according to the present disclosure, the in-series positioning of the evaporator 200, the air heater 300, and the electric heater 400 reduces the overall size of the air conditioning device for the electric vehicle. With this compact structure, cooled air and warm air are produced.

Specifically, as illustrated in FIG. 1, the air conditioning passage 130 connects the air intake port 110 to the air discharge port 120. The air conditioning passage 130 includes a first flow passage 131 in which the bypass door 500 is installed and a second flow passage 132 that connects the first flow passage 131 to the air discharge port 120.

The evaporator 200 is installed in a manner that the evaporator 200 is connected to the first flow passage 131 and the second flow passage 132. The air heater 300 and the electric heater 400 are positioned in series after the evaporator 200 in the second flow passage 132.

In this manner, the air conditioning passage 130 includes the first flow passage 131 and the second flow passage 132. The first flow passage 131 and the second flow passage 132 are partitioned by a partition wall. In other words, the first flow passage 131 connects the air intake port 110 to the air discharge port 120, and thus air introduced through the air intake port 110 passes only through the evaporator 200 and flows to the air discharge port 120. The second flow passage 132 is connected to the first flow passage 131, and thus the air introduced through the air intake port 110 passes through the air heater 300 and the electric heater 400, which are positioned after the evaporator 200, and flows to the air discharge port 120.

In this manner, the first flow passage 131 serves to secure an amount of flow of cooled air when providing cooled air. Some of the air flows bypasses the air heater 300 and the electric heater 400 and flows to the air discharge port 120. In the second flow passage 132, air is heated while passing through the air heater 300 and the electric heater 400, and thus the resulting warm air flows to the air discharge port 120. The degree of opening for each of the first flow passage 131 and the second flow passage 132 is controlled with the bypass door 500. A position, for determining the degree of opening, of the bypass door 500 varies depending on which of the cooled air and the warm air is to be provided.

The air conditioning system for the electric vehicle using the air conditioning device is described below.

As illustrated in FIG. 2, the air conditioning system for the electric vehicle according to the present disclosure includes a first refrigerant line L1, a second refrigerant line L2, a third refrigerant line L3, and a fourth refrigerant line L4. The first refrigerant line L1 connects the compressor 10 to the air heater 300. The second refrigerant line L2 connects the air heater 300 through a first expander 20 to the external heat exchanger 30. The third refrigerant line L3 connects the external heat exchanger 30 through a second expander 40 to the evaporator 200. The fourth refrigerant line L4 connects the evaporator 200 to the compressor 10.

Refrigerant flows along the first refrigerant line L1, the second refrigerant line L2, the third refrigerant line L3, and the fourth refrigerant line L4. Cooled air or warm air is produced according to a direction in which refrigerant flows. In this manner, a heat pump is realized.

The compressor 10 compresses the refrigerant and discharges the compressed refrigerant. Thus, the resulting refrigerant flows along the refrigerant lines. The expander expands the refrigerant or is fully opened to allow the refrigerant to pass through or is closed to not allow the refrigerant to pass through, depending on which of the cooled air and the warm air is to be provided. A plurality of expanders is provided. The opening and closing of the expanders are controlled according to the direction in which the refrigerant flows, which depends on which of the cooled air and the warm air is to be provided.

The external heat exchanger 30 may be positioned outside of the air conditioning system and adjusts temperature of the refrigerant by rotating a radiator fan.

The air conditioning system for the electric vehicle may further include a first bypass line L5 connecting the first refrigerant line L1 to the second refrigerant line L2. The refrigerant compressed in the compressor 10 bypasses the air heater 300 to the first bypass line L5. A first valve 50 is provided between the first refrigerant L1 and the first bypass line L5.

Accordingly, the refrigerant compressed in the compressor 10 flows along the first refrigerant line L1 and circulates throughout the air heater 300, or bypasses the air heater 300 and flows along the first bypass line L5 and the second refrigerant line L2, depending on whether the first valve 50 is opened or closed. When the first valve 50 selects the refrigerant line along which the refrigerant is to flow, the air heater 300 selectively heats air with the high temperature refrigerant compressed in the compressor 10.

The air conditioning system for the electric vehicle may further include a second bypass line L6 connecting the third refrigerant line L3 to the fourth refrigerant line L4. The refrigerant bypasses the second expander 40 and the evaporator 200 to the second bypass line L6. A second valve 60 may be provided in the second bypass line L6.

Accordingly, the refrigerant passing through the external heat exchanger 30 circulates throughout the evaporator 200 or bypasses the evaporator 200 to the second bypass line L6, and flows to the compressor 10, depending on whether the second expander 40 and the second valve 60 are opened or closed. Accordingly, it is determined whether or not the refrigerant circulates throughout the evaporator 200. Accordingly, the second valve 60 switches the direction in which the circulation flows, and thus air is selectively cooled.

The air conditioning system for the electric vehicle provides temperature-adjusted conditioned air using a controller 70 that controls the first expander 20, the second expander 40, the first valve 50, and the second valve 60 according to the cooling mode, the heating mode, and the temperature adjustment and dehumidification mode that are preset.

The controller 70 determines a specific mode according to a condition for a required temperature level inside the vehicle and controls the first expander 20, the second expander 40, the first valve 50, and the second valve 60. Cooled air or warm air that is produced using the refrigerant flowing along a plurality of refrigerant lines and a plurality of bypass lines is provided to the inside of the vehicle.

In one embodiment, in the cooling mode, the controller 70 opens the first valve 50 in a direction of allowing the refrigerant to flow to the first bypass line L5 and closes the second valve 60. Thus, first expander 20 is fully opened, and the second expander 40 expands the refrigerant.

Accordingly, as illustrated in FIG. 3, the refrigerant compressed in the compressor 10 bypasses the air heater 300 to the first bypass line L5, and then flows along the second refrigerant line L2 and circulates throughout the first expander 20. Accordingly, the high-temperature refrigerant does not circulate throughout the air heater 300 and thus air is not heated by the air heater 300.

The first expander 20 is fully opened to allow the refrigerant to pass through. The refrigerant flows to the external heat exchanger 30 and heat of the refrigerant is dissipated by the external heat exchanger 30. Thereafter, the refrigerant is expanded by the second expander 40, and thus the refrigerant evaporates in the evaporator 200. Accordingly, air passing through the evaporator 200 is cooled. The heat of the refrigerant is dissipated by the external heat exchanger 30 before the refrigerant flows to the second expander 40. This may improve the efficiency of the evaporation of the refrigerant by a heat pump.

As illustrated in FIG. 4, the controller 70 does not operate the electric heater 400 and opens the bypass door 500. Thus, some of the air introduced through the air intake port 110 bypasses the air heater 300 and the electric heater 400 and flows to the air discharge port 120 along the bypass door 500. Thus, the amount of cooled air may be secured.

When providing cooled air to the inside of the vehicle, the efficiency of cooling may be improved by realizing the heat pump and the amount of cooled air may be secured by opening the bypass door 500.

In the heating mode, the controller 70 opens the first valve 50 in a direction of allowing the refrigerant to flow to the air heater 300 and opens the second valve 60. Thus, the first expander 20 expands the refrigerant and the second expander 40 is closed.

Accordingly, as illustrated in FIG. 5, the refrigerant compressed in the compressor 10 flows along the first refrigerant line and circulates throughout the air heater 300, and thus the air heater 300 heats air by the dissipation of the heat of the refrigerant. By such a structure, warm air is produced.

The first expander 20 expands the refrigerant. The condensed refrigerant is expanded while passing through the air heater 300. The expanded refrigerant flows to the external heat exchanger 30 and evaporates in the external heat exchanger 30. By such a structure, external heat is absorbed. Thereafter, the second valve 60 is opened, and the second expander 40 is closed. Thus, the refrigerant flows along the second bypass line L6 and circulates throughout the compressor 10. External heat is absorbed by the external heat exchanger 30 before the refrigerant flows to the compressor 10, and thus the temperature of the refrigerant is increased. The increased temperature of the refrigerant is additionally increased through the compressor 10. This realization of the heat pump improves the efficiency of cooling by the air heater 300 when high-temperature refrigerant compressed in the compressor 10 circulates throughout the air heater 300.

Furthermore, as illustrated in FIG. 6, the controller 70 operates the electric heater 400 and closes the bypass door 500. Since the bypass door 500 is closed, the air introduced through the air intake port 110 flows to the air heater 300 and the electric heater 400. The temperature level of the air that is not reached only with the air heater 300 is reached with the electric heater 400. Thus, warm air at the required temperature level inside the vehicle is produced.

When providing cooled air to the inside of the vehicle, the efficiency of cooling may be improved by realizing the heat pump and a sufficient amount of cooled air may be secured by closing the bypass door 500.

In the temperature adjustment and dehumidification mode, the controller 70 opens the first valve 50 in a direction of allowing the refrigerant to flow to the heater 300 and closes the second valve 60. Thus, the first expander 20 is fully opened and the second expander 40 expands the refrigerant.

Accordingly, as illustrated in FIG. 7, the refrigerant compressed in the compressor 10 flows along the first refrigerant line L1 and circulates throughout the air heater 300, and thus the air heater 300 heats air by the dissipation of the heat of the refrigerant. By such a structure, warm air is produced. The first expander 20 is fully opened to allow the refrigerant to pass through. Thus, the refrigerant flows to the external heat exchanger 30 and heat of the refrigerant is dissipated by the external heat exchanger 30. Thereafter, the refrigerant is expanded by the second expander 40, and thus the refrigerant evaporates in the evaporator 200. Accordingly, the air passing through the evaporator 200 is cooled.

In this manner, when adjusting the temperature, the refrigerant circulates throughout both the air heater 300 and the evaporator 200, and thus both cooled air and warm air are produced. Then, the cooled air and warm air are mixed and, thus, the temperature of the air is adjusted. Furthermore, the controller 70 controls the Revolutions Per Minute (RPM) of the compressor 10 and thus adjusts temperature of the refrigerant. By such a structure, the temperature of the air is adjusted. In addition, moisture in the air is removed in the evaporator 200, and thus dehumidification is accomplished.

At this point, the controller 70 performs the following control in such a manner that the temperature of the air is adjusted precisely.

In other words, the controller 70 determines the temperature of the conditioned air, which is adjusted through the air heater 300 and the evaporator 200. The controller 70 performs control that turns on or off the electric heater 400 and control that opens or closes the first valve 50 such that the conditioned air is maintained at the required level of temperature inside the vehicle.

Regarding the temperature of the conditioned air, which is adjusted through the air heater 300 and the evaporator 200, the temperature of the air that passes through the evaporator 200 and the air heater 300 is determined based on the temperature of the refrigerant in the evaporator 200 and the temperature of the refrigerant in the air heater 300. A target temperature is a temperature that is set by an occupant inside the vehicle, or is a temperature optimized for the inside of the vehicle, which is automatically set.

Accordingly, the controller 70 compares the temperature of the conditioned air with the target temperature and controls each of the components concerned in such a manner that the conditioned air is maintained at a level of the target temperature.

In an embodiment, in a case where the temperature of the conditioned air is higher than the target temperature, the controller 70 does not operate the electric heater 400 and opens the first valve 50 in a direction of allowing the refrigerant to flow to the first bypass line L5.

When the temperature of the conditioned air is higher than the target temperature while warm conditioned air is provided, the electric heater 400 does not operate, and the first valve 50 is opened in a direction of allowing the refrigerant to flow to the first bypass line L5. Accordingly, the high temperature refrigerant compressed in the compressor 10 does not circulate throughout the air heater 300, and thus air is not heated. The cooled air passing through the evaporator 200 is provided, and thus the conditioned temperature is maintained at the level of the target temperature. At this time, the first expander 20 is opened, the second expander 40 expands the refrigerant, and the second valve 60 is closed. Furthermore, the controller 70 controls the bypass door 500 in such a manner that an amount of air passing through the evaporator 200 is secured as an amount of air flow.

In a case where the temperature of the conditioned air is lower than the target temperature, the controller 70 operates the electric heater 400 and opens the bypass door 500 in a direction of allowing the air to flow to the air heater 300 and the electric heater 400. Thus, an amount of air flow to the air heater 300 and the electric heater 400 is increased.

In this manner, in a case where cooled air is provided and where the temperature of the conditioned air is thus lower than the target temperature, the electric heater 400 is caused to operate and thus heats the conditioned air. Accordingly, the temperature of the conditioned air passing through the evaporator 200 and the air heater 300 is increased by the electric heater 400, and thus the conditioned air is maintained at the level of the target temperature. Furthermore, the bypass door 500 is opened in the direction of allowing the air to flow to the air heater 300 and the electric heater 400. Thus, an amount of air flowing to the air heater 300 and the electric heater 400 is secured and the conditioned air is efficiently maintained at the level of the target temperature.

In this manner, the controller 70 controls the flow of the air introduced through the air intake port 110. In other words, according to the degree to which the bypass door 500 is opened, an amount of flow of the cooled air passing only through the evaporator 200 is adjusted, and an amount of flow of the warm air passing through the air heater 300 and the electric heater 400 are adjusted. The direction of opening or closing the first valve 50 is selected to selectively allow the refrigerant to pass through the air heater 300. The operation of the electric heater 400 is controlled to adjust the temperature of flowing air.

As described above in terms of structure, in the air conditioning device for the electric vehicle and the air conditioning system for the electric vehicle using the air conditioning device, which are configured as described above, the evaporator 200, the air heater 300, and the PTC heater are positioned in series. With this compact structure, the sizes of the air conditioning device and the air conditioning system are reduced, and the performance in cooling and warming is improved by the heat pump.

Although the specific embodiment of the present disclosure has been described for illustrative purposes, those having ordinary skill in the art should appreciate that various modifications, additions and substitutions are possible, without departing from the scope and spirit of the present disclosure as disclosed in the accompanying claims.

What is claimed is:

1. An air conditioning system for an electric vehicle using an air conditioning device, the air conditioning device including
   a housing having an air conditioning passage connecting an air inlet port to an air discharge port,
   an evaporator, an air heater, and an electric heater, which are positioned in series in the air conditioning passage in the housing, and
   a bypass door positioned after the evaporator in the air conditioning passage in the housing and configured to selectively allow some of air passing through the evaporator to bypass the air heater and the electric heater to the air discharge port,
   the air conditioning system comprising:
   a first refrigerant line connecting a compressor to the air heater;
   a second refrigerant line connecting the air heater through a first expander to an external heat exchanger;
   a third refrigerant line connecting the external heat exchanger through a second expander to the evaporator;
   a fourth refrigerant line connecting the evaporator to the compressor; and
   a controller configured to control the first expander, the second expander, a first valve, and a second valve according to a cooling mode, a heating mode, and a temperature adjustment and dehumidification mode that are preset,
   wherein, in the temperature adjustment and dehumidification mode, the controller determines a temperature of conditioned air, which is adjusted by the air heater and the evaporator, performs control that turns on or off the electric heater, and performs control that opens or closes the first valve so that the temperature of the conditioned air is maintained at a level of a target temperature that varies with a required temperature inside the electric vehicle.

2. The air conditioning system of claim 1, further comprising:
a first bypass line connecting the first refrigerant line to the second refrigerant line, wherein refrigerant compressed in the compressor bypasses the air heater to the first bypass line, and wherein the first valve is provided between the first refrigerant line and the first bypass line.

3. The air conditioning system of claim 2, further comprising:
a second bypass line connecting the third refrigerant line to the fourth refrigerant line, wherein the refrigerant bypasses the second expander and the evaporator to the second bypass line, and wherein the second valve is provided in the second bypass line.

4. The air conditioning system of claim 1, wherein in the cooling mode, the controller opens the first valve in a direction of allowing the refrigerant to flow to the first bypass line and closes the second valve so that the first expander is fully opened and the second expander expands the refrigerant.

5. The air conditioning system of claim 1, wherein in the cooling mode, the controller does not operate the electric heater and opens the bypass door.

6. The air conditioning system of claim 1, wherein in the heating mode, the controller opens the first valve in a direction of allowing the refrigerant to flow to the air heater and opens the second valve so that the first expander expands the refrigerant and the second expander is closed.

7. The air conditioning system of claim 1, wherein in the heating mode, the controller operates the electric heater and closes the bypass door.

8. The air conditioning system of claim 1, wherein in the temperature adjustment and dehumidification mode, the controller opens the first valve in a direction of allowing the refrigerant to flow to the air heater and closes the second valve so that the first expander is fully opened and the second expander expands the refrigerant.

9. The air conditioning system of claim 1, wherein in the temperature adjustment and dehumidification mode, when temperature of conditioned air is higher than target temperature, the controller does not operate the electric heater and opens the first valve in a direction of allowing the refrigerant to flow to the first bypass line.

10. The air conditioning system of claim 1, wherein in the temperature adjustment and dehumidification mode, when temperature of conditioned air is lower than target temperature, the controller operates the electric heater and opens the bypass door in a direction of allowing the air to flow to the air heater and the electric heater to increase an amount of air flow.

11. An air conditioning system for an electric vehicle using an air conditioning device, the air conditioning device including
a housing having an air conditioning passage connecting an air inlet port to an air discharge port,
an evaporator, an air heater, and an electric heater, which are positioned in series in the air conditioning passage in the housing, and
a bypass door positioned after the evaporator in the air conditioning passage in the housing and configured to selectively allow some of the air passing through the evaporator to bypass the air heater and the electric heater to the air discharge port,
the air conditioning system comprising:
a first refrigerant line connecting a compressor to the air heater;
a second refrigerant line connecting the air heater through a first expander to an external heat exchanger;
a third refrigerant line connecting the external heat exchanger through a second expander to the evaporator;
a fourth refrigerant line connecting the evaporator to the compressor; and
a controller configured to control the first expander, the second expander, a first valve, and a second valve according to a cooling mode, a heating mode, and a temperature adjustment and dehumidification mode that are preset,
wherein, in the temperature adjustment and dehumidification mode, when a temperature of conditioned air is higher than a target temperature, the controller does not operate the electric heater and opens the first valve in a direction of allowing the refrigerant to flow to the first bypass line.

12. An air conditioning system for an electric vehicle using an air conditioning device, the air conditioning device including
a housing having an air conditioning passage connecting an air inlet port to an air discharge port,
an evaporator, an air heater, and an electric heater, which are positioned in series in the air conditioning passage in the housing, and
a bypass door positioned after the evaporator in the air conditioning passage in the housing and configured to selectively allow some of the air passing through the evaporator to bypass the air heater and the electric heater to the air discharge port,
the air conditioning system comprising:
a first refrigerant line connecting a compressor to the air heater;
a second refrigerant line connecting the air heater through a first expander to an external heat exchanger;
a third refrigerant line connecting the external heat exchanger through a second expander to the evaporator;
a fourth refrigerant line connecting the evaporator to the compressor; and
a controller configured to control the first expander, the second expander, a first valve, and a second valve according to a cooling mode, a heating mode, and a temperature adjustment and dehumidification mode that are preset,
wherein, in the temperature adjustment and dehumidification mode, when a temperature of conditioned air is lower than a target temperature, the controller operates the electric heater and opens the bypass door in a direction of allowing the air to flow to the air heater and the electric heater to increase an amount of airflow.

\* \* \* \* \*